Oct. 2, 1956       G. BLAKE       2,765,192
REPLACEABLE COVER FOR CONVERTIBLE AUTOMOBILE TOP
Filed April 16, 1953       5 Sheets-Sheet 1
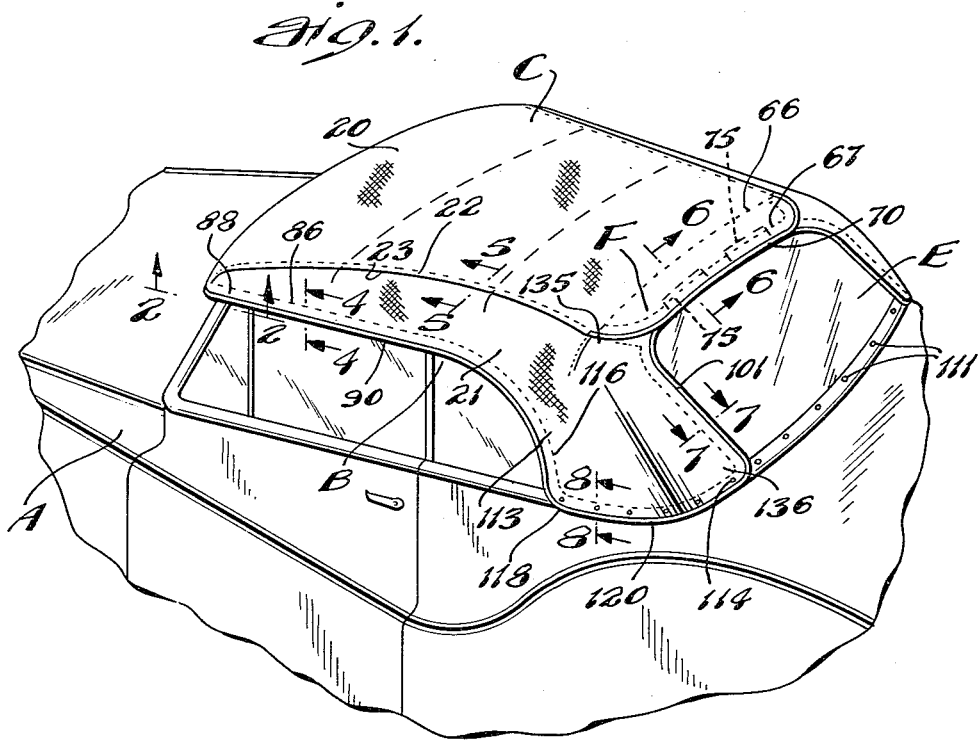
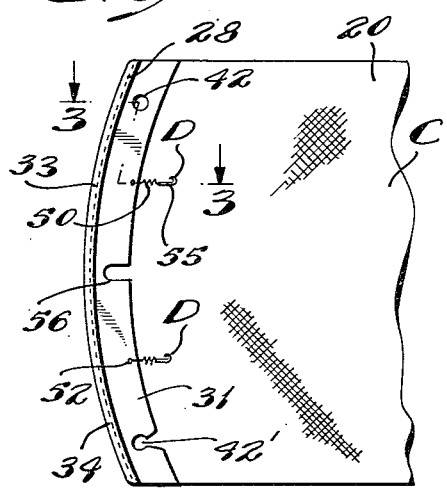
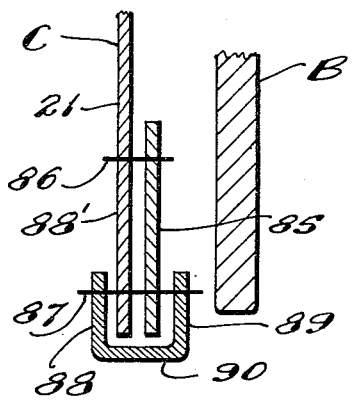
INVENTOR.
GEORGE BLAKE
BY
ATTORNEY Oct. 2, 1956  G. BLAKE  2,765,192
REPLACEABLE COVER FOR CONVERTIBLE AUTOMOBILE TOP
Filed April 16, 1953  5 Sheets—Sheet 2
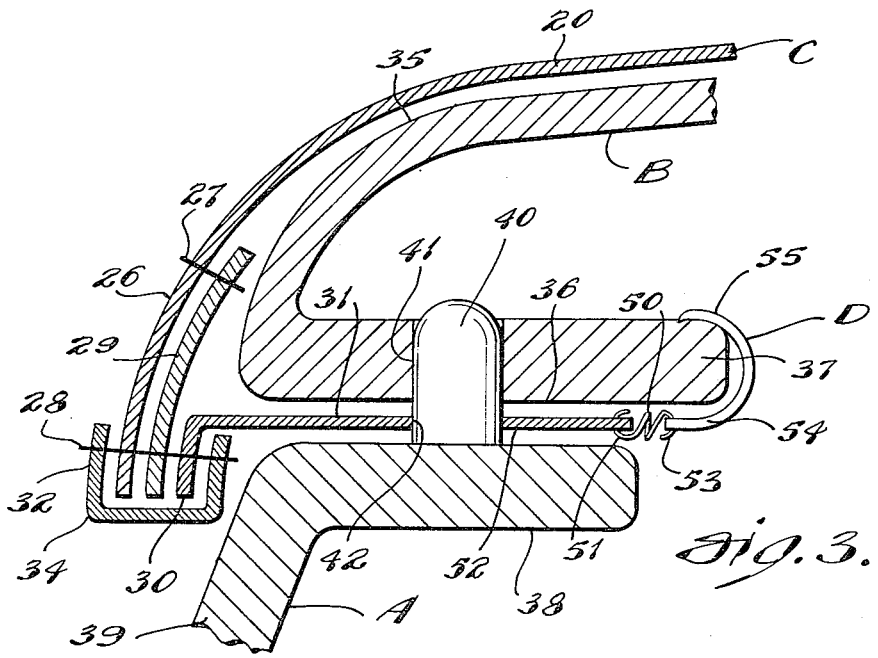
Fig. 3.
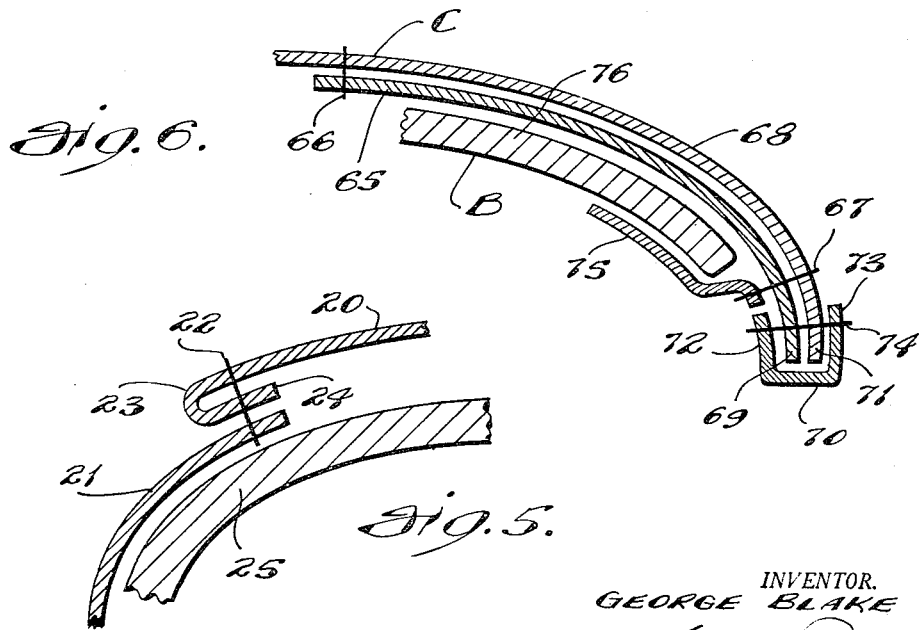
Fig. 6.
Fig. 5.
INVENTOR.
GEORGE BLAKE
BY
ATTORNEY Oct. 2, 1956 G. BLAKE 2,765,192
REPLACEABLE COVER FOR CONVERTIBLE AUTOMOBILE TOP
Filed April 16, 1953 5 Sheets-Sheet 3
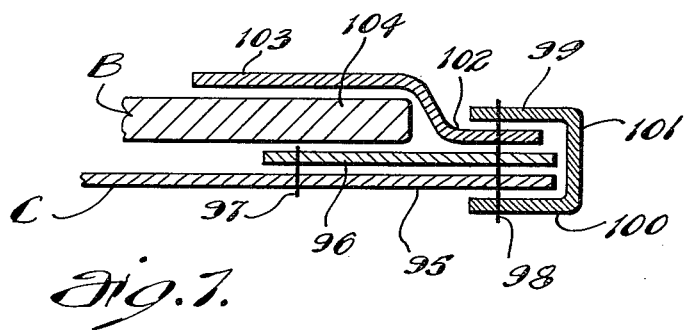
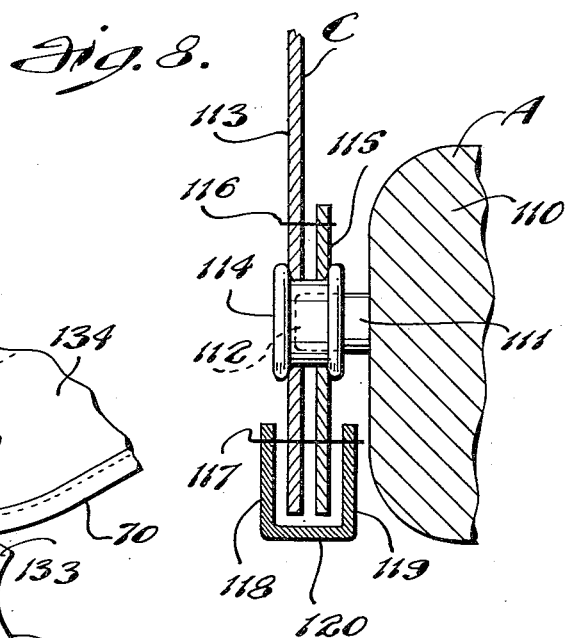
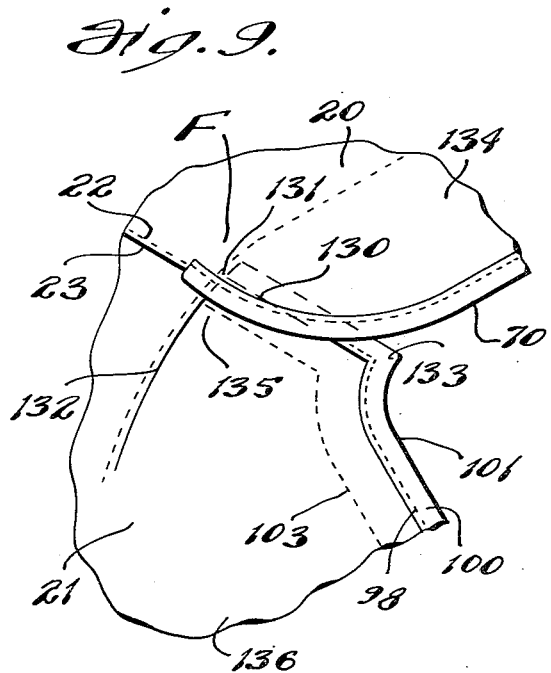
INVENTOR.
GEORGE BLAKE
BY
ATTORNEY Oct. 2, 1956 G. BLAKE 2,765,192
REPLACEABLE COVER FOR CONVERTIBLE AUTOMOBILE TOP
Filed April 16, 1953 5 Sheets-Sheet 4
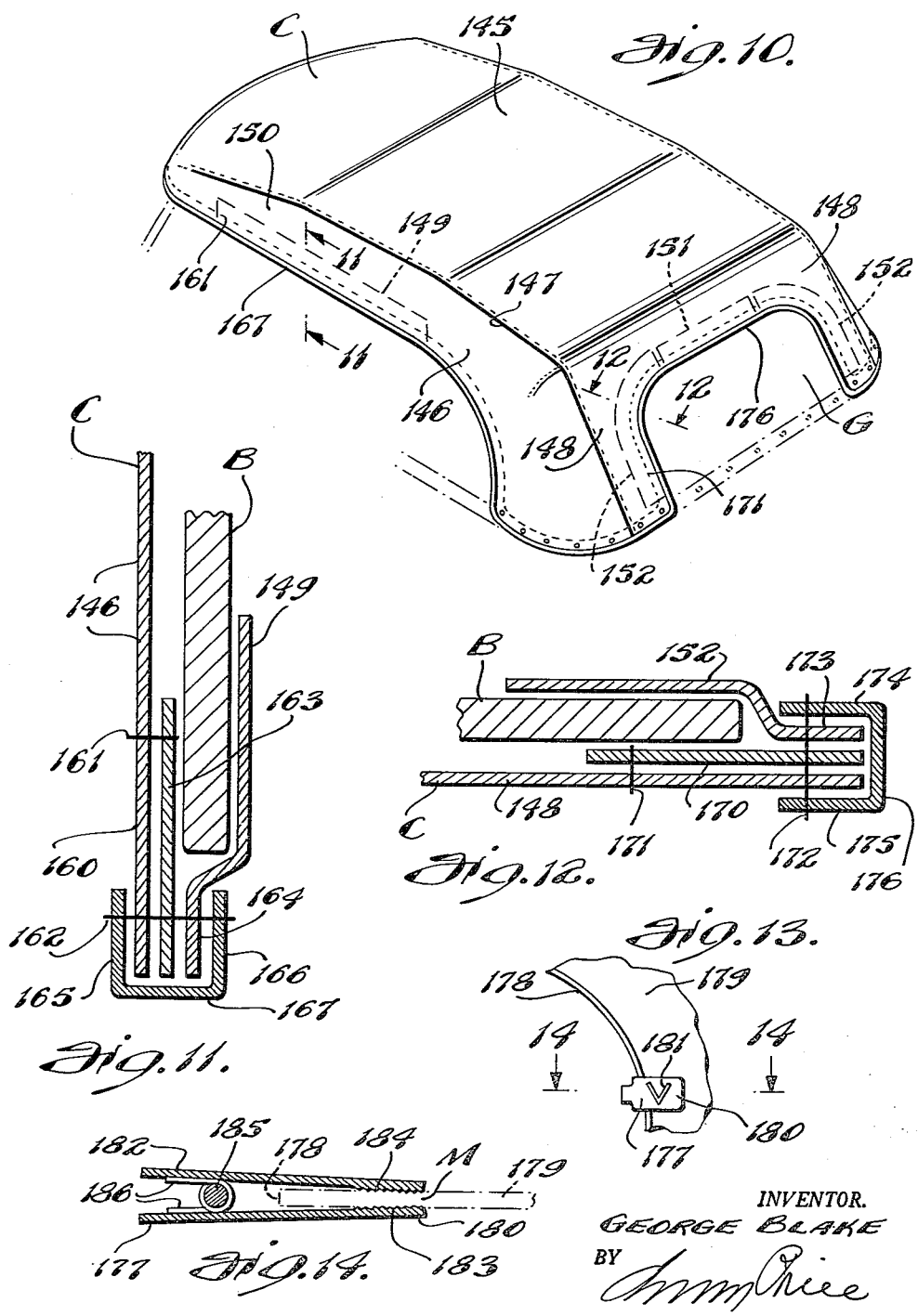
INVENTOR.
GEORGE BLAKE
BY
ATTORNEY

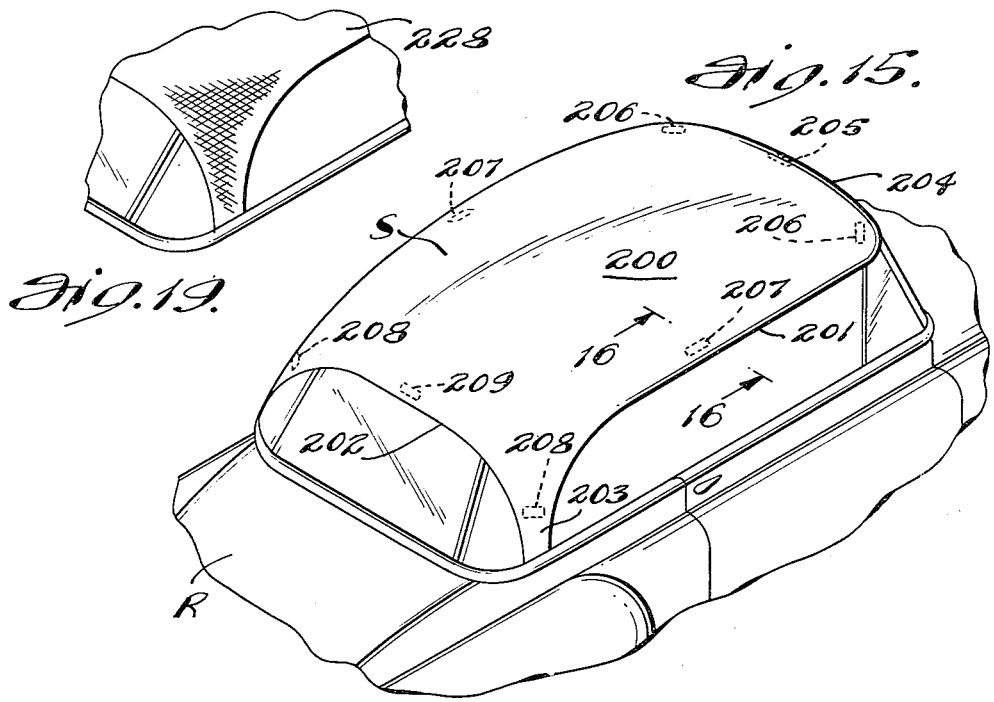
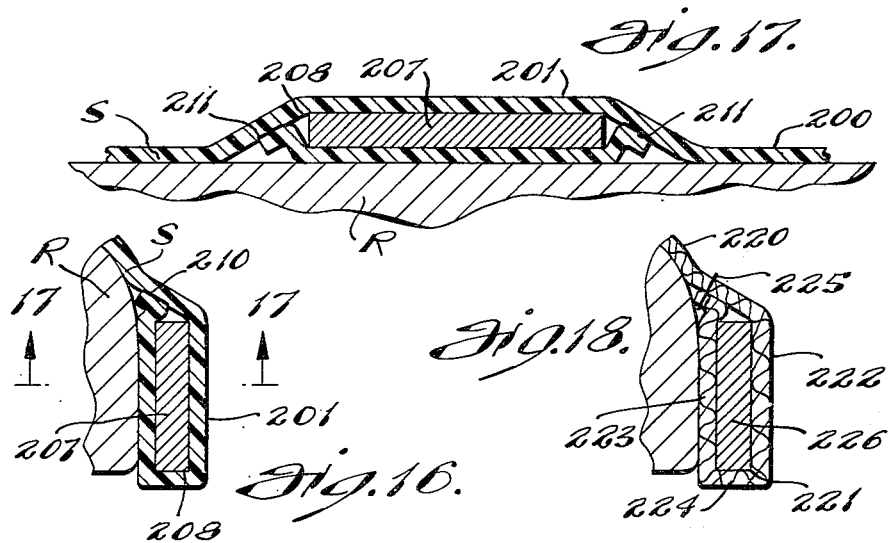

United States Patent Office 2,765,192
Patented Oct. 2, 1956

2,765,192

REPLACEABLE COVER FOR CONVERTIBLE AUTOMOBILE TOP

George Blake, Bronxville, N. Y.

Application April 16, 1953, Serial No. 349,115

2 Claims. (Cl. 296—107)

The present invention relates to a replaceable cover for the top of convertible automobiles and it particularly relates to a readily changeable top which may be readily applied and removed by the automobile owner.

It is among the objects of the present invention to provide a replaceable cover particularly designed for convertible automobile tops which may be readily fitted over the standard collapsible top and which may be readily installed or removed by the driver without tools or special equipment and without the need of aid from a service station or garage attendant.

Another object is to provide a decorative, removable fabric cover for the tops of convertible automobiles which will be firmly held in position when applied without danger of blowing off or ripping, even though the automobile is driven at considerable speeds through rain, snow or sleet and which automatically will give the top of the convertible automobile a desired decorative effect which may match the interior trimmings or seat covers of the automobile, or which may match the clothing of the driver or occupants of the automobile, or which may be used for achieving certain desired advertising or publicity in accordance with vehicle laws and regulations.

Still another object is to provide an automobile with changeable or replaceable fabric or plastic cover for convertible automobiles which may be used to protect the top or temporarily to prevent damage to the top or which may be used to seal the top in case of breakage or leakage thereto.

A further object is to provide a replaceable cover for convertible automobile tops which may be laundered, changed to suit the mood, weather, place or dress of the driver or occupants.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects it has been found most satisfactory, according to one embodiment of the present invention to provide a cloth or even laminated cover which may be applied readily to cover the top of a convertible automobile.

In the preferred form of the invention the cover is tailored or designed to match the standard convertible top and it has a main top panel desirably in one piece which may terminate at the rear upper edge of the top convertible automobile.

In an alternative form the top may have two downwardly directing legs which may enhance and extend down alongside of the rear window or opening of the convertible top.

The sides of the top are formed independently and stitched to the side edges of the top section of the replaceable cover. These side sections may terminate short of or extend to the sides of the rear window.

Desirably both the front end and the rear end of the replaceable top cover are provided with flaps which extend under the cover and serve to attach the top in position.

Desirably the front flap is clamped down by the front end of the top when the top is closed.

When the top is opened and collapsed into the compartment behind the rear seat of the convertible automobile, spring clips or connections are provided to keep the cover in position so that it will not fall off the front of the top.

At the rear of the automobile top, flaps are provided to be turned under and inside of the portions of the convertible top around the rear window. The fabric is desirably made of such a weave and preferably a taffeta weave of a relatively heavy spun or twisted cotton or rayon.

The dyes or printing paste utilized to give it color should be resistant to sun, rain or gas fading and the cover should be readily launderable or cleanable. The fabric of the replaceable cover may consist of resin cover or impregnated material. The cover may also be provided with face and rear laminations consisting of transparent plastic material which will be resistant to sun and water.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In the drawings wherein like reference characters denote corresponding parts throughout the several views:

Fig. 1 is a top perspective view of a convertible top with a replaceable cover of the present invention and position thereon.

Fig. 2 is a fragmentary under-side view of the front of the cover in position at the front of the top.

Fig. 3 is a transverse vertical sectional view upon the line 3—3 of Fig. 2 and upon the enlarged scale as compared to Fig. 2.

Fig. 4 is a transverse fragmentary vertical sectional view upon the line 4—4 of Fig. 1 and upon an enlarged scale as compared to Fig. 1.

Fig. 5 is a transverse fragmentary vertical sectional view upon the line 5—5 of Fig. 1 and upon an enlarged scale as compared to Fig. 1.

Fig. 6 is a transverse fragmentary vertical sectional view upon the line 6—6 of Fig. 1 and upon an enlarged scale as compared to Fig. 1.

Fig. 7 is a transverse fragmentary horizontal sectional view upon the line 7—7 of Fig. 1 and upon an enlarged scale as compared to Fig. 1.

Fig. 8 is a transverse fragmentary vertical sectional view upon the line 8—8 of Fig. 1 and upon an enlarged scale as compared to Fig. 1.

Fig. 9 is an enlarged corner perspective view of the rear corner area of the replaceable cover.

Fig. 10 is a top perspective view of an alternative embodiment of replaceable cover for a convertible top.

Fig. 11 is a fragmentary transverse vertical view upon the line 11—11 and upon an enlarged scale as compared to Fig. 10.

Fig. 12 is an enlarged fragmentary vertical section view upon the line 12—12 and upon an enlarged scale as compared to Fig. 10.

Fig. 13 is a fragmentary side elevational view showing an auxiliary holding clip in position upon the top.

Fig. 14 is a transverse horizontal scale view upon the line 14—14 and upon an enlarged scale as compared to Fig. 13.

Fig. 15 is a top perspective view of an alternative form of cover as applied to a hard top vehicle.

Fig. 16 is a transverse sectional view upon the line 16—16 of Fig. 15, and upon an enlarged scale as compared to Fig. 15.

Fig. 17 is a transverse sectional view upon the line 17—17 of Fig. 16.

Fig. 18 is a side sectional view similar to Fig. 16 showing a fabric cover instead of a plastic cover.

Fig. 19 is a fragmentary top perspective view of still another alternative showing a magnetic cover for a hard top vehicle.

Referring to Fig. 1 there is shown a convertible automobile A having the usual convertible top B with the replaceable fabric or other cover C thereon. The cover as shown in Fig. 1 is a main top section 20 and the side sections 21 stitched thereto at 22 as shown in Fig. 5 the outer edge 23 of the top section 20 is folded under at 24 and the three-plys are stitched together at 22. The sections 20 and 21 as stitched together at 22 will closely hug the portion 25 of the top B.

The front of the cover C as best shown in Figs. 3 and 4 extends downwardly as indicated at 26 and is stitched at 27 and 28 to the reinforcement strip 29. The stitching 28 also attaches the forward end 26 of the section 20 of the cover C to the down-turned under edge 30 of the rearwardly extending flap 31 and furthermore to the forward flange 32 and the rear flange 33 of the edging channel 34.

The sections 26, 29, 30, 32 and 33 are shown separated more clearly to illustrate the construction but it has to be understood that they are held closely together and in place by the stitching 38 and will closely contact and hug the top forward portion 35 of the convertible top B as well as the interior rearwardly extending bottom face 36 of the flange portion 37.

The flange portion 37 of the top B will normally be clamped down tightly upon the flange 38 of the frame 39 and cross the top of the windshield of the automobile. The placement and attachment stub or pin 40 extends through the opening 41 in the flange 37 of the top B.

The rearward extending flap 31 is also provided with an opening 42 to receive the stitch or pin 40 and normally the elements 37, 38 and 31 will be tightly clamped together when the forward portion of the convertible cover is closed.

To hold the replaceable cover upon the forward portion of the convertible top when it is lowered or removed the clips D may be provided. These clips consist of the spring connections 50 which are hooked at 51 to the edge 52 of the flap 31. These short coil springs 50 are also hooked at 53 to the base springs 54 of the engagement hooks 55 (see Figs. 2 and 3).

Referring to Fig. 2 it will be noted that there also is an opening or slot 56 in the center portion of the flap 31 which fits over the central pin projecting forwardly from the automobile frame section 38.

At the rear of the replaceable cover there is also a reinforcement strip 65 as shown in Fig. 6 which is stitched in position at 66 and 67 to the rear end 68 of the cover. The reinforcement strip extends downwardly at 69 to within the channel edging 70 and it is stitched together with the lower edge 71 to the sides 72 and 73 of the channel edging 70. The stitching 74 extends through the four plys. By means of the separate stitching 67 a flap 75 is provided which extends under the rearwardly extending portion 76 of the automobile top B. These will hold the rear of the automobile cover C in position, even though the flap 75 is not clamped down as is the flap 31 at the front of the replaceable cover.

At the side of the replaceable cover C as shown in Fig. 4 there is a stiffening strip 85 stitched in position at 86 and 87 to the end 88' of the replaceable cover C. The stitching 87 also extends through the side edges 88 and 89 of the channel edging 90.

Referring to the sides of the convertible cover C at the sides of the rear window E, as is best shown in Fig. 7 the rear edge 95 of the cover C has a rear stiffening strip 96 stitched in position by the stitching 97 and 98. The stitching 98 extends through the side portion 99 and 100 of the channel edging 101. The stitching 98 will also hold in seat channel 101 the end 102 of the flap 103. The flap 103 fits under the edge 104 of the convertible top B and assures that there will be no separation of the top at the rear sides of the rear window E during driving of the vehicle.

Referring to Fig. 8 there is shown the connection at the lower rear corners of the convertible top. The automobile frame 110 has a projecting stub 111 with a snap fastener 112. The edge 113 of the cover C may be provided with a cooperating snap connection or cap 114. This snap 114 extends through the edge 113 of the cover C as well as through the stiffening strip 115 where the stiffening thereby is stitched in position by the lines of stitching 116 and 117. The stitching 117 extends through the sides 118 and 119 of the channel edging 120.

Referring to Fig. 9 there is shown the corner construction at F indicated in small scale in Fig. 1 and enlarged scale in Fig. 9. The top section 20 and the side section 21 will each be provided with channel edging 70 and 101 which will overlap as indicated at 130 the overlapping terminating in 131. The side panel 21 may be gathered as indicated at 132. The side panel may also come out to a point as indicated at 133 so as to fit more snugly under the overlying flap 134 and against the convertible top B.

It will be noted by referring to Fig. 1 that two short flaps 75 are provided but if desired one long flap may also be utilized.

Referring to Figs. 1 and 9 the inside flap 103 may extend from the point 135 to the point 136.

In the alternative embodiment of Figs. 10, 11 and 12 there is shown a top section 145 and side sections 146. These sections are joined together by the stitching 147.

The top section 145 has the two side flaps 148 which extend downwardly on each side of the rear window G.

There is shown in Fig. 10 also a forwardly extending side flap 149 which will hold the side portions 150 of the cover C in position.

Around the rear window G there is one central flap 151 and 152 to hold the rear of the cover C in position.

The side flaps 149 are attached in the manner shown in Fig. 11. The lower edge 160 of the panel 146 is stitched at 161 and 162 to the stiffening strip 163. The stitching 162 also extends through the lower edge 164 of the attachment flap 149. The stitching also extends through the sides 165 and 166 of the channel edging 167.

In Fig. 12 is shown the manner of the attachment flaps 152. To the legs 148 is stitched the stiffening strip 170 by the lines of stitching 171 and 172. The stitching 172 extends through the edge 173 of the flap 152 and also through the sides 174 and 175 of the channel edging 176.

Referring to Fig. 13 there is shown an auxiliary clamp 177 which may be attached to the edging 178 on the top section 179. The face 180 of the clamp may carry the initial or decorative design 181.

The clamp has a rear face or jaw 182.

The front and rear plates 180 and 182 have the serrated gripping edges 183 and 184 for gripping the cover M. The plates 180 and 182 are mounted upon the pivot pin 185 and a coil spring tends to bias the jaws 180 and 182 together as shown in Fig. 14.

In the embodiment of Fig. 15 there is shown a cover 200 designed to be applied to a hard top automobile R or an automobile which is of the non-convertible type.

This cover 200 has the side edges 201 which extend along the top above the side windows and it has the rear edge 202 with the downwardly extending legs 203 which clear the rear window.

Sewn or permanently attached in pockets in the cover S are magnet elements 205, 206, 207, 208 and 209 which will hold the cover tightly engaged against the steel top structure of the automotive vehicle R.

As shown in Fig. 16, the magnet 207 is received in a pocket 208 which is formed by folding up the material and heat sealing it at 210.

As indicated in Fig. 17, the heat sealing is also applied at 211 at the sides of the pocket 208.

This heat sealing arrangement may be applied when a thermoplastic sheet material is utilized or when a woven fabric S is employed having thermoplastic threads.

The magnets 205 to 209 are preferably of a permanent magnetic metal such as Alnico.

In the embodiment of Fig. 18, the fabric of the cover 220 has a pocket 221 having the walls or sides 222 and 223 and the bottom 224.

The permanent magnet 226 is inserted in such pocket and held in position by the stitching 225.

In the form of invention shown in Fig. 19, the cover 228 may carry in its threads or by means of a coating, finely divided uniformly distributed particles of permanent magnetic material which will adhere to the steel top of an automotive vehicle in the same manner as the magnets 205 to 209 of Fig. 15.

It is thus apparent that the applicant has provided a novel replaceable cover for convertible or hard top automobiles which may be readily applied and changed for cleaning or design purposes and which will remain permanently in position on the top when driving.

While there has been herein described a preferred form of the invention, it should be understood that the same may be altered in details and in relative arrangement of parts within the scope of the appended claims.

Having now particularly described and ascertained the nature of the invention, and in what manner the same is to be performed, what is claimed is:

1. A replaceable decorative automobile cover for ready windproof attachment and detachment to cover the fabric top of a convertible automobile comprising a tailored cover to fit over the collapsible fabric top, said cover having lateral downwardly extending side panels extending from the front to the rear of the top, a U-cross section terminal channel member, a narrow stiff reinforcing strip extending the length of the side panels at the inside lower edges of the side panels and an attachment flap extending the length of the lower edges of the side panels having a free upper edge to fit under the lower side edges of the fabric top, said U-cross section channel member receiving the lowermost edge of said side panels, said reinforcing strips and said attachment flaps and the sides of said U-cross-section channel member being stitched to said last mentioned lowermost edges.

2. The cover of claim 1, said cover also having a central panel with flaps fitting in and below the rear portions of the fabric top around the rear window of said fabric top.

References Cited in the file of this patent
UNITED STATES PATENTS

| | | |
|---|---|---|
| 2,048,461 | Mosgoffian | July 21, 1936 |
| 2,479,825 | Fleischhauer | Aug. 23, 1949 |
| 2,524,171 | Karsted | Oct. 3, 1950 |
| 2,649,330 | Schamel et al. | Aug. 18, 1953 |